US011720681B2

(12) United States Patent
Li et al.

(10) Patent No.: US 11,720,681 B2
(45) Date of Patent: Aug. 8, 2023

(54) FIRMWARE EXECUTION PROFILING AND VERIFICATION

(71) Applicant: Micron Technology, Inc., Boise, ID (US)

(72) Inventors: Yun Li, Fremont, CA (US); Harini Komandur Elayavalli, San Jose, CA (US); Mark Ish, San Ramon, CA (US)

(73) Assignee: Micron Technology, Inc., Boise, ID (US)

( * ) Notice: Subject to any disclaimer, the term of this patent is extended or adjusted under 35 U.S.C. 154(b) by 354 days.

(21) Appl. No.: 17/062,146

(22) Filed: Oct. 2, 2020

(65) Prior Publication Data
US 2021/0200875 A1 Jul. 1, 2021

Related U.S. Application Data

(60) Provisional application No. 62/955,557, filed on Dec. 31, 2019.

(51) Int. Cl.
G06F 21/57 (2013.01)
G06F 9/32 (2018.01)
(Continued)

(52) U.S. Cl.
CPC ............ G06F 21/572 (2013.01); G06F 9/321 (2013.01); G06F 11/323 (2013.01);
(Continued)

(58) Field of Classification Search
CPC ...... G06F 21/572; G06F 9/321; G06F 11/323; G06F 11/3636; G06F 21/566;
(Continued)

(56) References Cited

U.S. PATENT DOCUMENTS

| 2004/0260913 | A1* | 12/2004 | Babu ................... | G06F 11/3612 712/220 |
| 2005/0155026 | A1* | 7/2005 | DeWitt, Jr. ........... | G06F 11/348 714/E11.2 |
| 2018/0060213 | A1* | 3/2018 | Mola ................... | G06F 11/3636 |

OTHER PUBLICATIONS

Subramanyan, Pramod, et al., Verifying information flow properties of firmware using symbolic execution, 2016. (Year: 2016).*

* cited by examiner

*Primary Examiner* — Trong H Nguyen
(74) *Attorney, Agent, or Firm* — Lowenstein Sandler LLP

(57) ABSTRACT

An example method of generating an execution profile of a firmware module comprises: receiving an execution trace of a firmware module comprising a plurality of executable instructions, wherein the execution trace comprises a plurality of execution trace records, wherein each execution trace record of the plurality of execution trace records indicates a successful execution of an executable instruction identified by a program counter (PC) value; retrieving a first execution trace record of the plurality of execution trace records, wherein the first execution trace record comprises a first PC value; identifying a first executable instruction referenced by the first PC value; identifying a firmware function containing the first executable instruction; incrementing a cycle count for the firmware function by a number of cycles associated with the first executable instruction; and generating, using the cycle count, an execution profile of the firmware module.

20 Claims, 6 Drawing Sheets

(51) Int. Cl.
*G06F 11/32* (2006.01)
*G06F 11/36* (2006.01)
*G06F 21/56* (2013.01)

(52) U.S. Cl.
CPC ........ *G06F 11/3636* (2013.01); *G06F 21/566* (2013.01); *G06F 21/577* (2013.01)

(58) Field of Classification Search
CPC .... G06F 21/577; G06F 11/3471; G06F 21/52; G06F 21/57; G06F 13/126; G06F 13/1673
See application file for complete search history.

310

==================ENTRANCE DETECTED====================
[Fe_Api_ReadState_Coherenc] cur:2687384185
--------
[Fe_Api_ReadState_Coherenc]      fwcycle:18     callcnt:1      avg:18
[FeReadPath_ResourcesCoher]      fwcycle:9      callcnt:1      avg:9
[FeReadPath_CoherencyStsCh]      fwcycle:10     callcnt:2      avg:5
--------------
Total fwcycle:38

# FIRMWARE EXECUTION PROFILING AND VERIFICATION

REFERENCE TO RELATED APPLICATION

This application claims the benefit of U.S. Provisional Patent Application No. 62/955,557, filed Dec. 31, 2019, the entirety of which is incorporated herein by reference.

TECHNICAL FIELD

The present disclosure generally relates to computer systems, and more specifically, relates to firmware execution profiling and verification.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various implementations of the disclosure.

FIG. 3 schematically illustrates another example execution profile generated by a firmware execution profiler operating in accordance with embodiments of the present disclosure.

DETAILED DESCRIPTION

Figure 1:
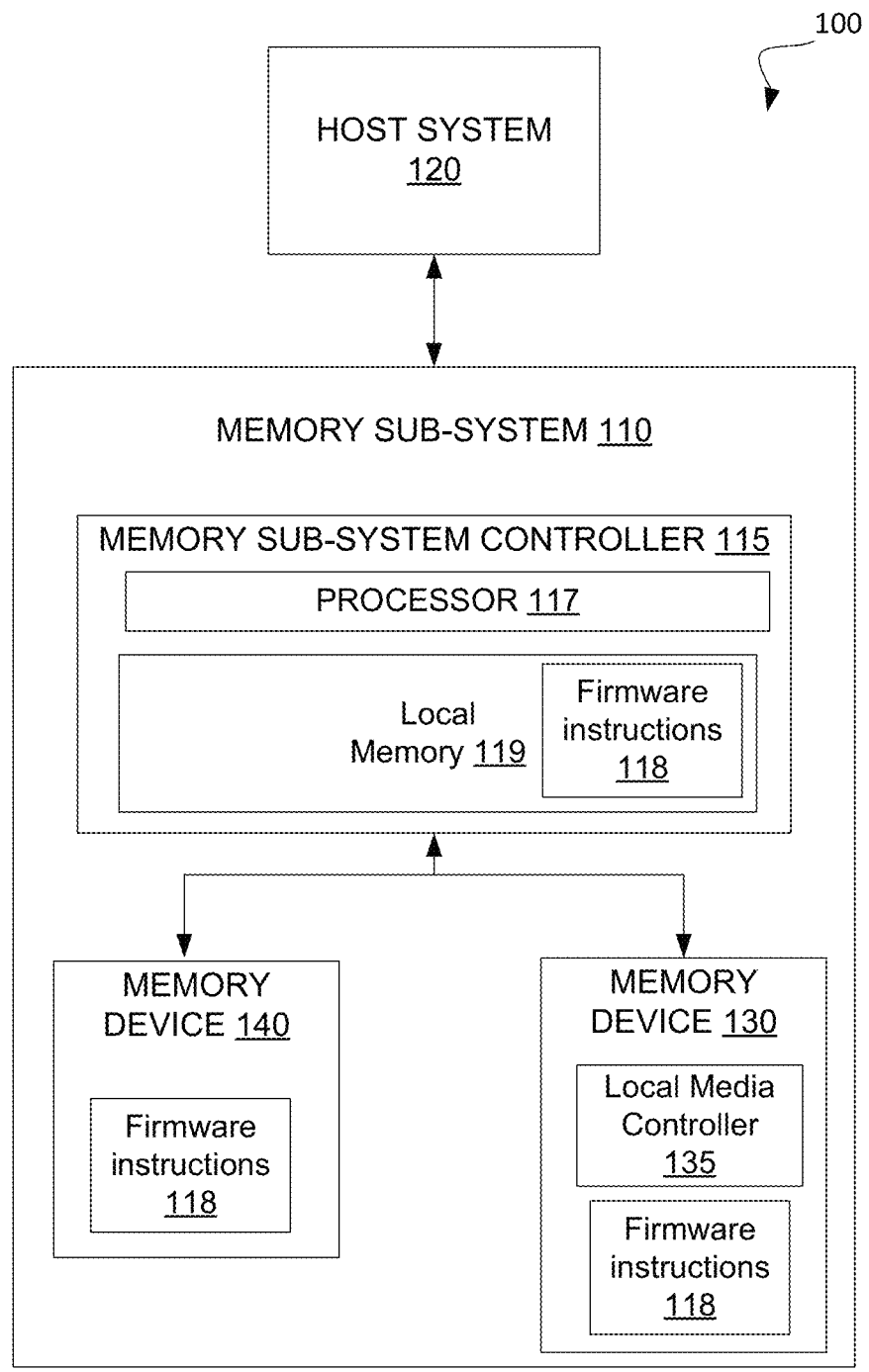
FIG. 1 illustrates an example computer system that includes a memory sub-system in accordance with embodiments of the present disclosure.

Aspects of the present disclosure are directed to firmware execution profiling and verification, e.g., for firmware utilized by memory sub-systems. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such memory devices. The host system can provide data to be stored at the memory sub-system and can request data to be retrieved from the memory sub-system.

A memory device can be a non-volatile memory device, which is a package of one or more dice. The dice in the packages can be assigned to one or more channels for communicating with a memory sub-system controller. The non-volatile memory devices include cells (i.e., electronic circuits that store information), that are grouped into pages to store bits of data. One example of non-volatile memory devices is a negative-and (NAND) memory device. Other examples of non-volatile memory devices are described below in conjunction with FIG. 1.

The memory sub-system controller can include one or more general purpose or specialized microcontrollers, special purpose logic circuitry (e.g., a field programmable gate array (FPGA), an application specific integrated circuit (ASIC), etc.), and/or other suitable processors running executable firmware modules that manage the memory devices and facilitate their interactions with the host. The firmware can initially be developed using one or more suitable programming languages, such as the assembly language or C/C++. While general purpose or specialized integrated development environments (IDEs) running on personal computers or other computing devices can be employed for firmware development and performing limited debugging tasks, such IDEs are usually not suitable for firmware profiling and performance verification, since they fail to adequately emulate the timing or instruction execution, thread synchronization, and/or other various aspects that can be of a paramount importance for profiling and performance verification.

Aspects of the present disclosure address the above and other deficiencies by providing a firmware execution profiler which generates execution profiles with a single cycle accuracy. The firmware execution profiler can be implemented by one or more software modules running on a general purpose computer system (such as a personal computer, a notebook computer, a tablet, a smartphone) or any other suitable computer system. The firmware execution profiler operating in accordance with one or more aspects of the present disclosure can receive and process an execution trace produced by a firmware execution environment (e.g., a debugger). The firmware execution profiler can process the execution trace and generate various execution profiles and execution profile summaries, which can be utilized for performance verification and testing, as described in more detail herein below.

FIG. 1 illustrates an example computer system 100 that includes a memory sub-system 110, which includes a controller running various firmware modules for managing one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computer system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device (e.g., a processor).

The computer system 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks Although non-volatile memory components such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute firmware instructions 118 stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. In some embodiments, the firmware instructions may be stored on one or more memory devices 130, 140.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

As noted herein above, a firmware module contains a set of executable instructions, which are intended for execution by the memory sub-system controller 115 and/or one or more local media controllers 135. Firmware execution profiling and verification can involve running one or more firmware modules in an execution environment (e.g., a debugger) that is capable of producing at least a basic timestamped execution trace. An example execution trace can include multiple execution trace records, such that each execution trace record maps a program counter (PC) value to a timestamp corresponding to executing the machine instruction identified by the PC value, thus indicating a successful execution of the instruction. "Program counter" herein shell refer to a special purpose register of a processor. During program execution, the PC stores, depending on the processor architecture and instruction set, the address of the currently executed instruction or the address of the next instruction to be executed by the processor.

The firmware execution profiler operating in accordance with one or more aspects of the present disclosure receives and processes the execution trace produced by the firmware execution environment (e.g., a Joint Test Action Group (JTAG) debugger or any other suitable debugger). Based on the received firmware execution trace, the firmware execution profiler can produce various execution profiles and execution profile summaries, which can be utilized for firmware performance testing and verification.

Figure 2:
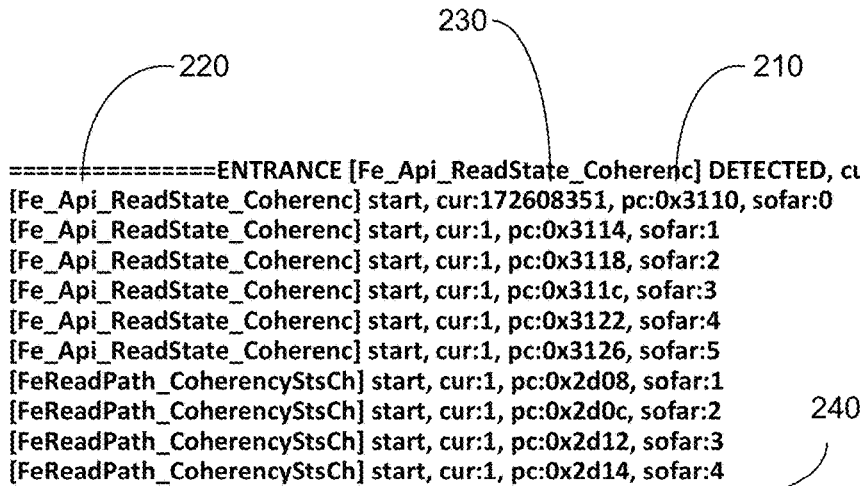
FIG. 2 schematically illustrates an example execution profile generated by a firmware execution profiler operating in accordance with embodiments of the present disclosure.

In some embodiments, the firmware execution profiler can generate an execution profile as schematically illustrated by FIG. 2. Each entry of the example execution profile of FIG. 2 can include the PC value 210, an identifier (e.g., a symbolic name) 220 of the function whose scope includes the executable instructions identified by the PC value, the timestamp 230, and the counter of executable instructions within the current function call 240. "Function" herein shall refer to a group of executable instructions having at least one entry point and at least one return instruction for returning the execution flow control to the caller (e.g., the calling function).

In some embodiments, the firmware execution profiler can further generate an execution profile, a schematically illustrated by FIG. 3. The example execution profile of FIG. 3 includes, for each executable function, its identifier (e.g., a symbolic name) 310, the total number of processor cycles 320 taken by the function to execute, the number of times 330 the function was called, and an aggregated (e.g., the average over multiple function calls) number 340 of processor cycles taken for the function to execute.

In an illustrative example, the firmware execution profiler can map each execution trace record (which, as noted herein above, includes the PC value and the corresponding timestamp) to a corresponding source code line. In an illustrative example, the source code can be provided by an assembly listing, each line of which corresponds to a single executable machine instruction. The assembly listing can show the offset (relative address) of each executable machine instruction with respect to the start of the executable module, which can be used by the firmware execution profiler in order to identify the assembly listing line corresponding to a specific executable instruction referenced by the execution trace.

Thus, the firmware execution profiler can utilize the PC values of the execution trace to map each executable instruction referenced by the execution trace to a corresponding source code line. In an illustrative example, the firmware execution profiler can compute, for each execution trace record, the offset (relative address) of the corresponding executable instruction with respect to the start of the firmware loadable module. The relative address can be computed by subtracting, from the PC value supplied by the execution trace record, the absolute address identifying the entry point of the firmware module has been loaded for the execution. Since the assembly listing uses the relative addresses, the computed relative address would thus identify the source code line corresponding to the machine instruction references by the execution trace record.

The firmware execution profiler can further utilize the computed relative address for identifying the function whose scope includes the machine instruction references by the execution trace record. In an illustrative example, the firmware execution profiler can traverse the list of functions that is ordered by their respective relative starting addresses, until a function is identified whose address range (i.e., the relative address range from the starting address of the function till the ending address of the function) includes the computed relative address.

Once the function is identified, the firmware execution profiler can accordingly increment the counter of the number of calls to the function (if the instruction referenced by the current execution trace record is an entry point to the function) or increment the number of processing cycles that are taken to execute the current function call. In some embodiments, the firmware execution profiler can render the generated execution profile via a graphical user interface (GUI).

The execution profile can then be compared with the intended execution flows, e.g., by comparing the target number of calls and/or execution cycle counts for each function with the respective actual number of calls and/or actual execution cycle counts. In some embodiments, the firmware execution profiler can identify the functions whose actual performance parameters (e.g., the actual number of function calls and/or actual execution cycle counts) differ from the target parameters by more than certain threshold values. In some embodiments, the firmware execution profiler can generate and render one or more GUI screens highlighting the functions and/or individual commands for which performance issues (e.g., deviation of actual performance parameters from the corresponding target performance parameters) have been identified.

Figure 4:
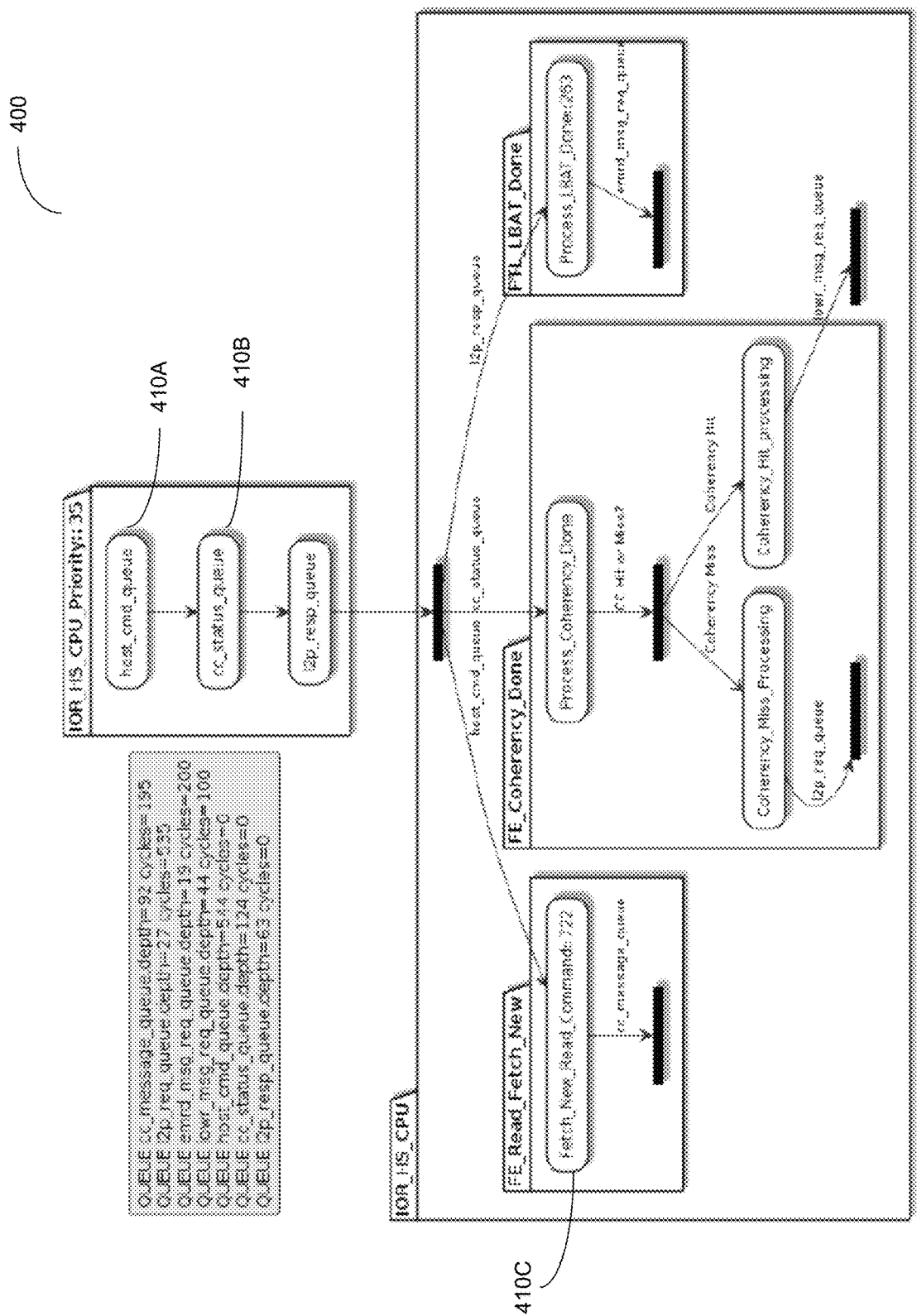
FIG. 4 is an example UML diagram illustrating a firmware execution flow enhanced by the execution profile data generated by the firmware execution profiler operating in accordance with embodiments of the present disclosure.

FIG. 4 is an example UML diagram 400 illustrating a firmware execution flow enhanced by the execution profile data generated by the firmware execution profiler operating in accordance with embodiments of the present disclosure. As schematically illustrated by FIG. 4, the firmware execution flow shows sequences of function calls 410A-410N and the number of cycles taken by executing each function.

Figure 5:
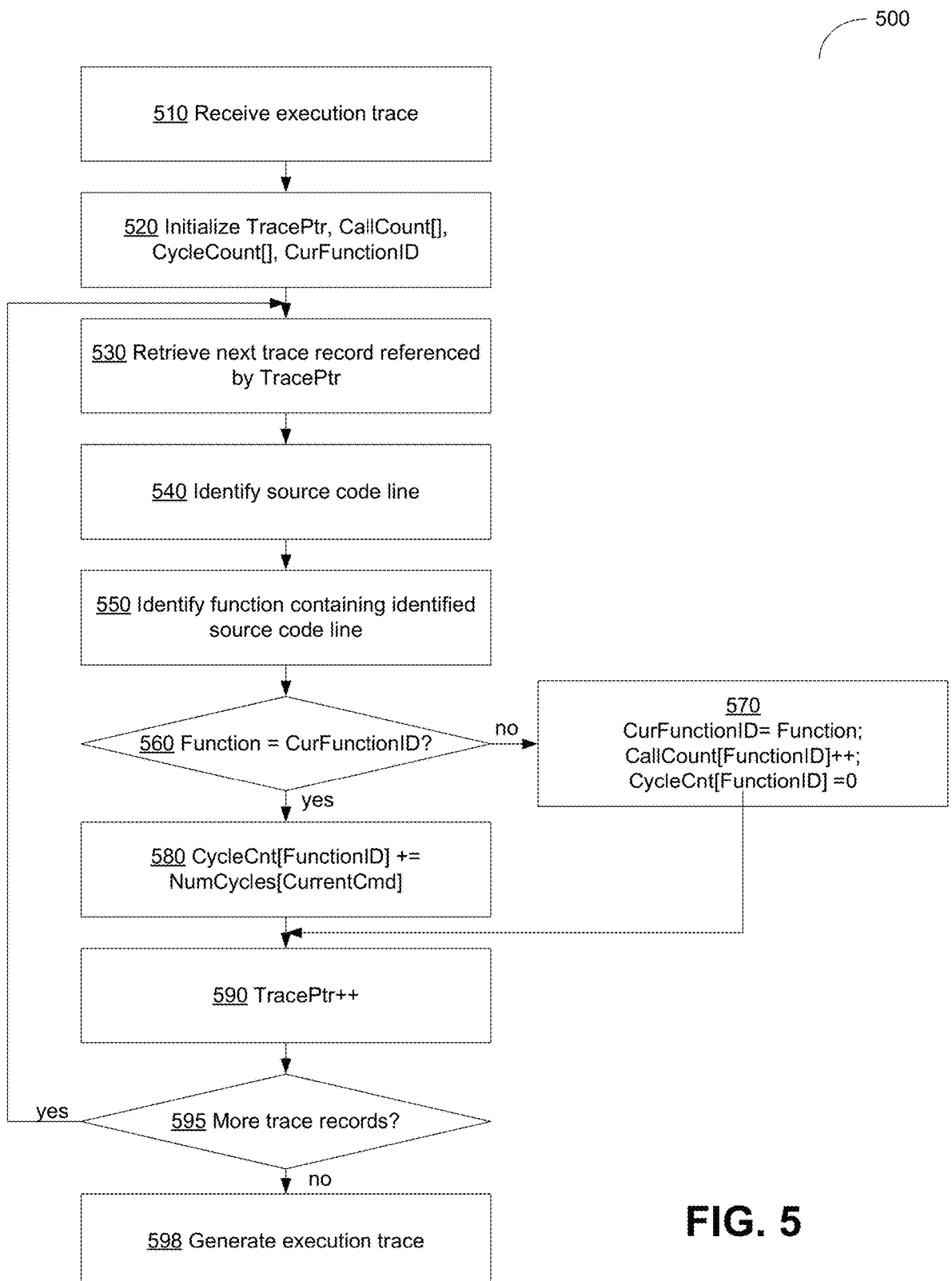
FIG. 5 is a flow diagram of an example method 500 of generating a firmware execution profile in accordance with embodiments of the present disclosure.

FIG. 5 is a flow diagram of an example method 500 of generating a firmware execution profile in accordance with embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by a computer system, such as computer system 600 of FIG. 6. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible.

At operation 510, the processing device implementing the method receives an execution trace for a firmware module. The execution trace can include execution trace records that are ordered based on the execution flow of respective executable instructions. Each execution trace record maps a program counter (PC) value to a timestamp corresponding to executing the instruction identified by the PC, as described in more detail herein above.

At operation 520, the processing device implementing the method initializes the execution trace pointer TracePtr, call counter array CallCount[ ], the cycle counter array CycleCount[ ], and the function identifier variable CurFunctionID. The execution trace pointer TracePtr is employed to store the index of the execution trace record that is currently being processed. The call counter array CallCount[ ] is employed to store the number of calls to the function identified by the array index. The cycle count array CycleCount[ ] is employed to store the number of cycles taken by executing the function identified by the array index. The CurFunctionID variable is employed to store the identifier of the function that is currently being processed (i.e., the function whose scope comprises the executable instruction referenced by the current execution trace record).

At operation 530, the processing device retrieves the next execution trace record (i.e., the record identified by the execution trace pointer) of the execution trace of the firmware module.

At operation 540, the processing device identifies the executable instruction and the source code line corresponding to the PC value specified by the execution trace record. In an illustrative example, the processing device computes the difference of the PC value specified by the execution trace record and the PC value corresponding to the entry point (e.g., the first trace record) of the firmware module that is currently being profiled, and then identifies the source code line whose offset with respect to the entry point of the firmware module matches the computed relative address, as described in more detail herein above.

At operation 550, the processing device identifies the function containing the identified executable instruction. In an illustrative example, the processing traverses the list of functions that is ordered by their respective relative starting addresses, until a function is identified whose address range (i.e., the relative address range from the starting address of the function till the ending address of the function) includes the computed relative address.

Responsive to determining, at operation 560, that the identifier of the function matches the stored function identifier CurFunctionID (i.e., that the current executable instruction belongs to the same function as the immediate previous executable instruction), the processing continues at operation 580; otherwise, the method branches to operation 570.

At operation 570 (which is performed responsive to determining, at operation 560, that the current executable instruction belongs to the same function as the immediate previous executable instruction), the processing device increments the cycle count for the function that is currently being processed by the number of cycles that is taken to execute the current executable instruction. The processing continues at operation 590.

At operation 580 (which is performed responsive to determining, at operation 560, that a new function is now being processed), the processing device updates the function identifier variable CurFunctionID with the identifier (e.g., a symbolic name) of the function identified at operation 550; increments the call count for the function identified at operation 550; and resets the cycle count for the function identified at operation 550.

At operation 590, the processing device increments the execution trace pointer Trace Ptr.

Responsive to determining, at operation 595, that the execution trace contains more trace records, the method loops back to operation 530; otherwise, the processing continues at block 598.

At block 598, the processing device generates the execution profile of the firmware module. In an illustrative example, the generated execution profile can include a separate text line corresponding to each executable instruction. The line can include the PC value, an identifier (e.g., a symbolic name) of the function whose scope includes the executable instructions identified by the PC value, the timestamp, and the counter of cycles within the current function call. In another illustrative example, the generated execution profile can include, for each executable function, its identifier (e.g., a symbolic name), the total number of processor cycles taken by the function to execute, the number of times the function was called, and an aggregated (e.g., the average over multiple function calls) number of processor cycles taken for the function to execute, as described in more detail herein above. The generated execution profile can be stored in a file, displayed via a graphical user interface (GUI), and/or transmitted via a network to a remote computer system.

Figure 6:
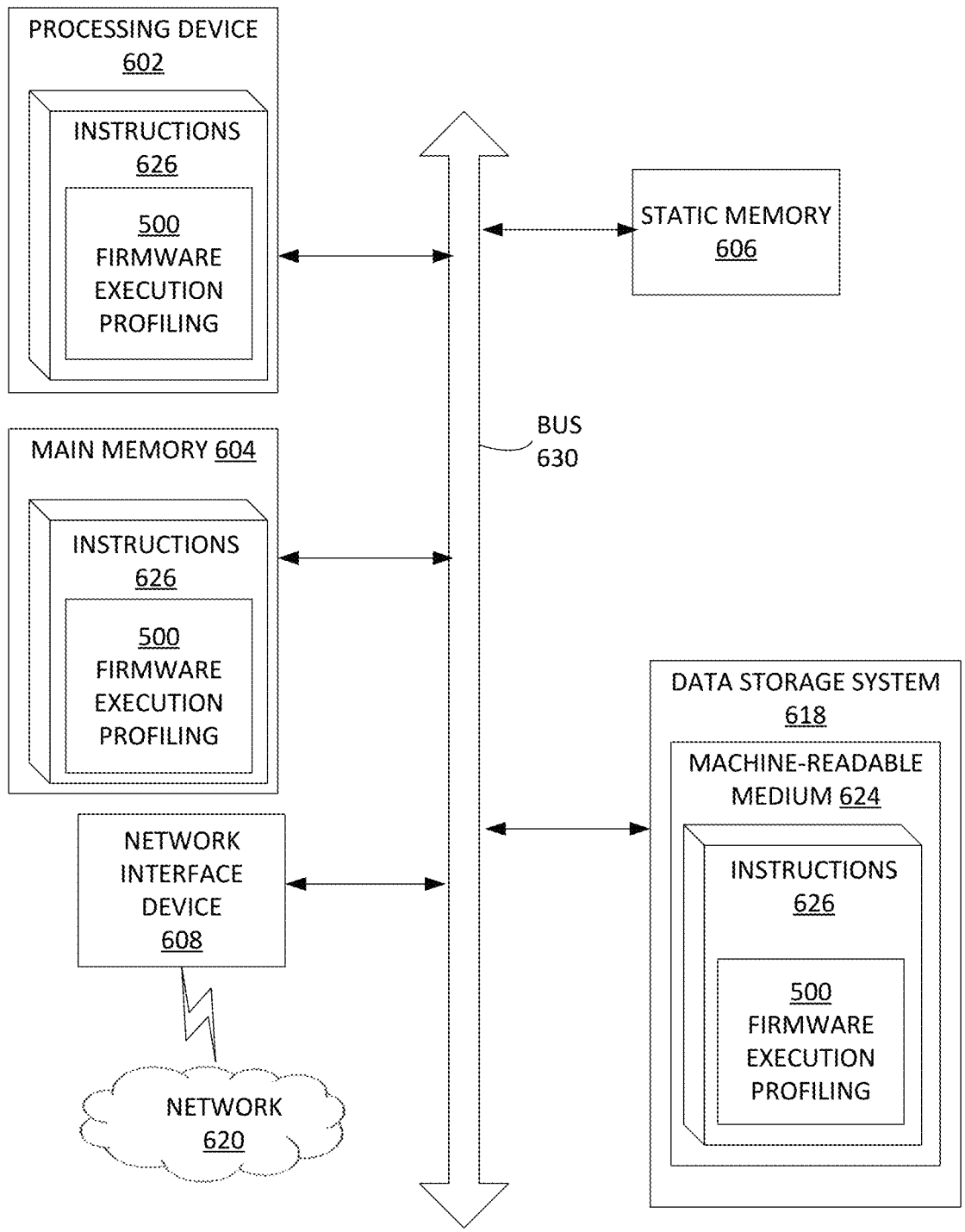
FIG. 6 is a block diagram of an example computer system in which implementations of the present disclosure can operate.

FIG. 6 illustrates an example machine of a computer system 600 within which a set of instructions, for causing the machine to perform any one or more of the methodologies discussed herein, can be executed. In some embodiments, the computer system 600 can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, digital or non-digital circuitry, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality of the firmware execution profiler described herein, including the example method 500 of generating a firmware execution profile. While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
   receiving, by a processing device, an execution trace of a firmware module comprising a plurality of executable instructions, wherein the execution trace comprises a plurality of execution trace records, wherein each execution trace record of the plurality of execution trace records indicates a successful execution of an executable instruction identified by a program counter (PC) value;
   retrieving a first execution trace record of the plurality of execution trace records, wherein the first execution trace record comprises a first PC value;
   identifying a first executable instruction referenced by the first PC value;
   identifying a firmware function containing the first executable instruction;
   incrementing a cycle count for the firmware function by a number of cycles associated with the first executable instruction;
   generating, using the cycle count, an execution profile of the firmware module; and
   utilizing, by the processing device, the execution profile for firmware verification.

2. The method of claim 1, wherein each execution trace record of the plurality of execution trace records further comprises a timestamp.

3. The method of claim 1, wherein the plurality of execution trace records are ordered based on an execution flow of the plurality of executable instructions.

4. The method of claim 1, wherein the execution trace is generated by an execution environment running the firmware module.

5. The method of claim 1, further comprising:
   responsive to determining that an identifier of the firmware function does not match a stored function identifier, incrementing a call count associated with the firmware function.

6. The method of claim 1, wherein generating the execution profile further comprises:
   generating a text comprising a source code line associated with the first executable instruction, the first PC value, and the cycle count.

7. The method of claim 1, further comprising:
   causing the execution profile to be rendered by a graphical user interface (GUI).

8. The method of claim 1, wherein identifying the first executable instruction referenced by the first PC value further comprises:
   computing a relative address by subtracting a second PC value corresponding to an entry point of the firmware module from the first PC value; and
   identifying a source code line identified by the relative address.

9. The method of claim 8, wherein identifying the firmware function further comprises:
   traversing a list of functions that is ordered by relative starting addresses, until a function is identified having an address range that includes the relative address.

10. A system, comprising:
    a memory; and
    a processing device coupled to the memory, the processing device to perform operations, comprising:
      receiving an execution trace of a firmware module comprising a plurality of executable instructions, wherein the execution trace comprises a plurality of execution trace records, wherein each execution trace record of the plurality of execution trace records indicates a successful execution of an executable instruction identified by a program counter (PC) value;
      retrieving a first execution trace record of the plurality of execution trace records, wherein the first execution trace record comprises a first PC value;
      identifying a firmware function containing a first executable instruction referenced by the first PC value;
      incrementing a cycle count for the firmware function by a number of cycles associated with the first executable instruction; and
      generating an execution profile of the firmware module, wherein the execution profile comprises a source code line associated with the first executable instruction, the first PC value, and the cycle count.

11. The system of claim 10, wherein the plurality of execution trace records are ordered based on an execution flow of the plurality of executable instructions.

12. The system of claim 10, wherein the execution trace is generated by an execution environment running the firmware module.

13. The system of claim 10, wherein the operations further comprise:
    responsive to determining that an identifier of the firmware function does not match a stored function identifier, incrementing a call count associated with the firmware function.

14. The system of claim 10, wherein the operations further comprise:
    causing the execution profile to be rendered by a graphical user interface (GUI).

15. The system of claim 10, wherein identifying the first executable instruction referenced by the first PC value further comprises:
    computing a relative address by subtracting a second PC value corresponding to an entry point of the firmware module from the first PC value; and
    identifying a source code line identified by the relative address.

16. The system of claim 10, wherein identifying the firmware function further comprises:
    traversing a list of functions that is ordered by relative starting addresses, until a function is identified having an address range that includes the relative address.

17. A non-transitory computer-readable storage medium comprising executable instructions which, when executed by a processing device, cause the processing device to perform operations, comprising:
- receiving an execution trace of a firmware module comprising a plurality of executable instructions, wherein the execution trace comprises a plurality of execution trace records, wherein each execution trace record of the plurality of execution trace records indicates a successful execution of an executable instruction identified by a program counter (PC) value;
- retrieving a first execution trace record of the plurality of execution trace records, wherein the first execution trace record comprises a first PC value;
- identifying a first executable instruction referenced by the first PC value;
- identifying a firmware function containing the first executable instruction;
- incrementing a cycle count for the firmware function by a number of cycles associated with the first executable instruction;
- generating, using the cycle count, an execution profile of the firmware module; and
- utilizing the execution profile for firmware verification.

18. The non-transitory computer-readable storage medium of claim 17, wherein the plurality of execution trace records are ordered based on an execution flow of the plurality of executable instructions.

19. The non-transitory computer-readable storage medium of claim 17, wherein the operations further comprise:
- responsive to determining that an identifier of the firmware function does not match a stored function identifier, incrementing a call count associated with the firmware function.

20. The non-transitory computer-readable storage medium of claim 17, wherein identifying the first executable instruction referenced by the first PC value further comprises:
- computing a relative address by subtracting a second PC value corresponding to an entry point of the firmware module from the first PC value; and
- identifying a source code line identified by the relative address.

* * * * *